(12) United States Patent
Panciroli et al.

(10) Patent No.: US 8,055,436 B2
(45) Date of Patent: Nov. 8, 2011

(54) METHOD FOR ZONE CONTROLLING A WASTEGATE IN A TURBOCHARGED INTERNAL COMBUSTION ENGINE

(75) Inventors: Marco Panciroli, Bologna (IT);
Francesco Alunni, San Sisto (IT);
Stefano Sgatti, Imola (IT)

(73) Assignee: Magneti Marelli S.p.A. (IT)

( * ) Notice: Subject to any disclaimer, the term of this patent is extended or adjusted under 35 U.S.C. 154(b) by 0 days.

(21) Appl. No.: 12/905,173

(22) Filed: Oct. 15, 2010

(65) Prior Publication Data

US 2011/0088390 A1    Apr. 21, 2011

(30) Foreign Application Priority Data

Oct. 15, 2009  (IT) ................ BO2009A0670

(51) Int. Cl.
*B60T 7/12* (2006.01)
(52) U.S. Cl. .............. 701/108; 123/568.11; 60/602
(58) Field of Classification Search .............. 701/108, 701/109; 123/698, 568.11, 568.15–568.26, 123/672, 480, 478; 60/602, 605.1, 607, 608, 60/611
See application file for complete search history.

(56) References Cited

U.S. PATENT DOCUMENTS

| | | | |
|---|---|---|---|
| 6,076,352 A | | 6/2000 | Hayashi |
| 6,637,205 B1 * | | 10/2003 | Ahmad et al. .............. 60/608 |
| 7,117,078 B1 * | | 10/2006 | Gangopadhyay ............ 701/103 |
| 7,281,531 B1 * | | 10/2007 | Fulton et al. ............. 123/568.17 |
| 7,740,010 B2 * | | 6/2010 | Fulton et al. .................. 123/698 |
| 2011/0088388 A1 * | | 4/2011 | Panciroli et al. .............. 60/602 |
| 2011/0088389 A1 * | | 4/2011 | Panciroli et al. .............. 60/602 |

FOREIGN PATENT DOCUMENTS

| | | |
|---|---|---|
| DE | 19936269 A1 | 2/2001 |
| DE | 102004016011 A1 | 10/2005 |
| FR | 2872547 A1 | 6/2006 |
| WO | 2004027235 A1 | 1/2004 |

OTHER PUBLICATIONS

MTZ Motortechnische Zeitschrift 61 (2003) 3, "Modellgestützte Reglerentwicklung für einen Abgasturbolader mit variabler Turbinengeometrie an einem DI-Dieselmotor." XP-000928799.
Apr. 7, 2010 Search Report for Italian Patent App. No. B02009A 000670.

* cited by examiner

*Primary Examiner* — John Kwon
(74) *Attorney, Agent, or Firm* — Bliss McGlynn, P.C.

(57) ABSTRACT

A method for controlling the wastegate in a turbocharged internal combustion engine including the steps of: determining, during a design phase, a control law which provides an objective opening of a controlling actuator of the wastegate according to the supercharging pressure; determining an objective supercharging pressure; measuring an actual supercharging pressure; determining a first open loop contribution of an objective position of a controlling actuator of the wastegate by means of the control law and according to the objective supercharging pressure; determining a second closed loop contribution of the objective position of the controlling actuator of the wastegate; and calculating the objective position of the controlling actuator of the wastegate by adding the two contributions.

15 Claims, 7 Drawing Sheets

METHOD FOR ZONE CONTROLLING A WASTEGATE IN A TURBOCHARGED INTERNAL COMBUSTION ENGINE

BACKGROUND OF THE INVENTION

1. Field of the Invention

The present invention relates to a method for controlling the wastegate in a turbocharged internal combustion engine.

2. Description of the Related Art

Some internal combustion engines are provided with a turbocharger supercharging system, which can increase the power developed by the engine by exploiting the enthalpy of exhaust gases for compressing the air aspirated by the engine, and thus increasing volumetric intake efficiency.

A turbocharger supercharging system typically includes a turbocharger provided with a turbine, which is arranged along an exhaust pipe to rotate at a high speed under the bias of the exhaust gases expelled by the engine, and with a supercharger. The supercharger is rotated by the turbine and is arranged along the air feeding pipe to compress the air aspirated by the engine. In a turbocharger supercharging system, the operating range of the turbocharger must be kept within a useful zone depending on the crank position for both functional reasons (i.e. to avoid irregular or low efficiency operation) and for structural reasons (i.e. to avoid damaging the turbocharger). In order to be able to limit the supercharging pressure (i.e. the pressure of the compressed air downstream of the supercharger), in bypass pipe regulated by a wastegate is arranged in parallel to the turbine. When the wastegate is opened part of the exhaust gas flows along the bypass pipe, and thus bypasses the turbine, and this decreases the rotation speed of the impeller, and thus decreases the supercharging.

A pneumatic actuator controlled by a regulating solenoid valve which regulates the intervention of the wastegate is used to control the wastegate. The pneumatic actuator comprises a sealed shell, which internally supports a flexible membrane, which divides the sealed shell into two reciprocally, fluid-tight chambers. The flexible membrane is mechanically connected to a rigid rod, which controls the wastegate for controlling the opening and closing of the wastegate itself. A first chamber is connected to atmospheric pressure, while a second chamber is connected to the supercharging pressure and is connectable to atmospheric pressure by means of a pipe regulated by the regulating solenoid valve of the proportional type, which is adapted to divide the pipe between a closed position, in which the pipe is completely closed, and a maximum opening position.

A contrast spring, which is compressed between a wall of the shell and the flexible membrane, and which rests on the flexible membrane on the side opposite to the rod, is arranged in the first chamber. When the pressure difference between the two chambers is lower than an intervention threshold (determined by the preload of the contrast spring), the rod maintains the wastegate in a completely closed position. When the pressure difference between the two chambers is higher than the intervention threshold, the contrast spring starts to compress under the bias of the flexible membrane, which is thus deformed, determining a movement of the rod, which consequently moves the wastegate towards the opening position. By controlling the regulating solenoid valve, the second chamber can be connected to atmospheric pressure with a variable introduction gap, and thus the pressure difference between the two chambers can be regulated, which difference, in turn, determines the opening or closing of the wastegate. It is worth noting that until the difference between the supercharging pressure and the atmospheric pressure exceeds the intervention threshold (equal to the preload generated by the contrast spring divided by the flexible membrane area), the wastegate cannot be opened by the action exerted by the regulating solenoid valve (which can only reduce, and not increase, the pressure difference between the supercharging pressure and atmospheric pressure).

In internal combustion engines of the type generally known in the related art, an objective supercharging pressure is generated, which is used to generate a control of the wastegate by adding an open loop contribution and a closed loop contribution: the open loop contribution is generated using an experimentally obtained control map, while the closed loop contribution is provided by a PID regulator. The PID regulator attempts to cancel a pressure error, which is typically represented by the difference between the objective supercharging pressure and the actual supercharging pressure measured by a sensor.

However, the preload generated by the contrast spring of the pneumatic actuator has a high construction dispersion, a considerable thermal drift and also a certain time drift. Furthermore, the pneumatic actuator has a considerable hysteresis. Thus, the behavior of the pneumatic actuator significantly varies between the opening movement and the opposite closing movement. Consequently, the map used for determining the closed loop contribution is strongly non-linear and the pursuing of the objective supercharging pressure is complicated. Thus, in internal combustion engines of the type generally known in the related art, the pursuing of the objective supercharging pressure tends to have high overshoots or undershooting (i.e. the actual supercharging pressure either exceeds or is even much lower than the objective supercharging pressure), and thus cause oscillations, particularly when the supercharging pressure surrounds the intervention threshold under which the wastegate cannot be opened by the action exerted by the regulating solenoid valve.

Overshoots (i.e. peaks) of the supercharging pressure are particularly annoying because they determine high strain (potentially dangerous in time) in the mechanical components of the internal combustion engine and because they may generate both noise perceivable by the vehicle occupants and corresponding undesired oscillations of the torque generated by the internal combustion engine.

In order to reduce overshoots it is possible to reduce the integrative contribution of the PID regulator used to calculate the closed loop contribution of the wastegate control. However, this solution makes pursuing the objective pressure very slow (thus considerably increases the so-called turbo-lag) and often does not allow the system to reach the objective supercharging pressure (i.e. the actual supercharging pressure tends to the objective supercharging pressure but never reaches it).

SUMMARY OF THE INVENTION

It is the object of the present invention to provide a method for controlling a wastegate in a turbocharged internal combustion engine that is free from the above-described drawbacks, and specifically, is easy and cost-effective to implement.

Accordingly, the present invention is directed toward a method for controlling the wastegate in a turbocharged internal combustion engine including the steps of: determining, during a design phase, a control law which provides an objective opening of a controlling actuator of the wastegate according to the supercharging pressure; determining an objective supercharging pressure; measuring an actual supercharging pressure; determining a first open loop contribution of an objective position of a controlling actuator of the wastegate by means of the control law and according to the objective supercharging pressure; determining a second closed loop contribution of the objective position of the controlling actuator of the wastegate; and calculating the objective position of the controlling actuator of the wastegate by adding the two contributions.

BRIEF DESCRIPTION OF THE DRAWINGS

Other objects, features and advantages of the present invention will be readily appreciated as the same becomes better understood after reading the subsequent description taken in connection with the accompanying drawings wherein.

DETAILED DESCRIPTION OF THE PREFERRED EMBODIMENT(S)

Figure 1:
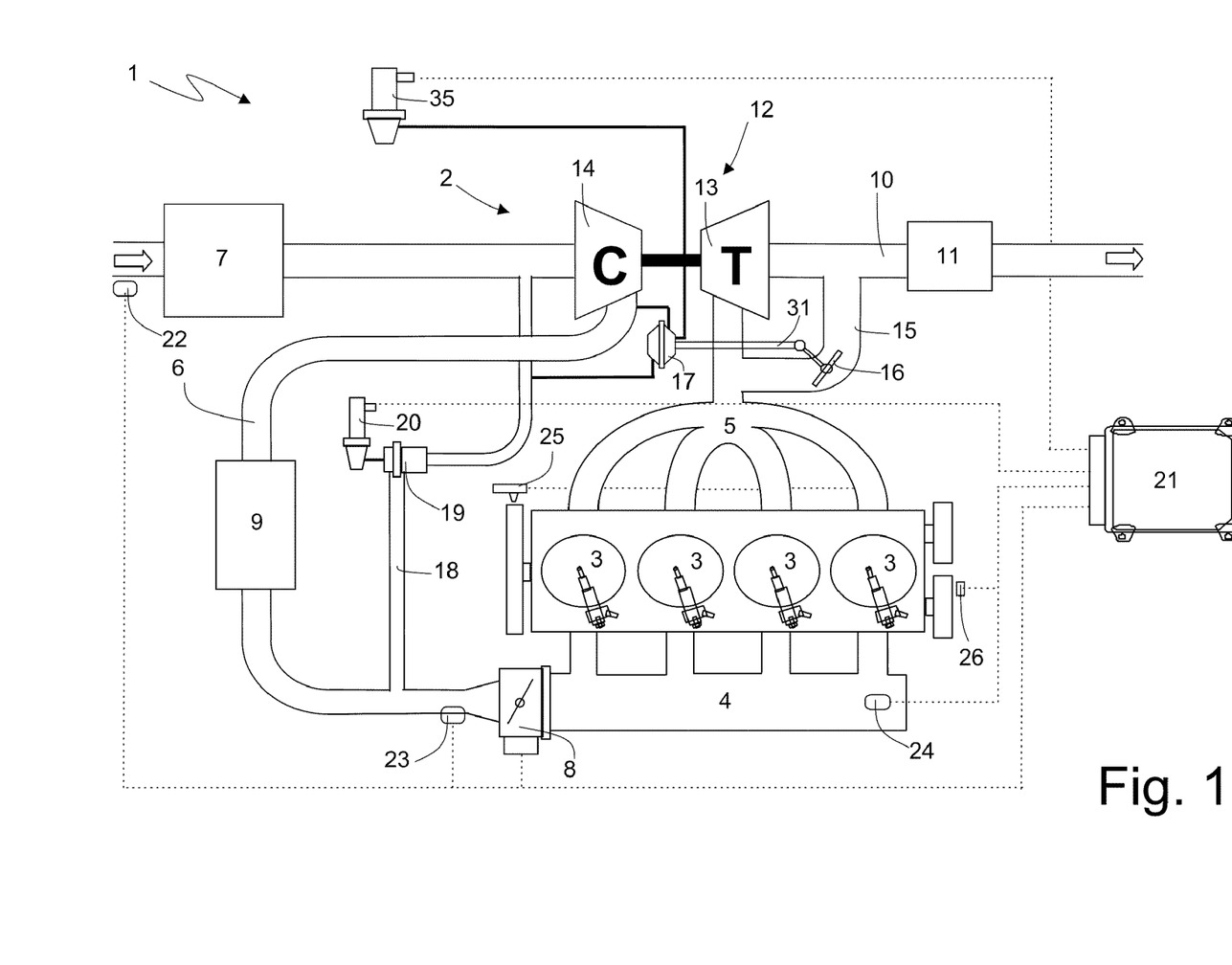
FIG. 1 is a diagrammatic view of an internal combustion engine turbocharged by means of a turbocharger and provided with a control unit which implements the wastegate control method of the present invention.

An internal combustion engine supercharged by means of a turbocharger supercharging system 2 is generally indicated at 1 in FIG. 1.

In the internal combustion engine 1 includes four cylinders 3, each of which is connected to an intake manifold 4 by means of at least one respective intake valve (not shown) and to an exhaust manifold 5 by means of at least one respective exhaust valve (not shown). The intake manifold 4 receives fresh air (i.e. air coming from the external environment) through an intake pipe 6, which is provided with an air cleaner 7 and is regulated by a butterfly valve 8. An intercooler 9 for cooling the intake air may be arranged along the intake pipe 6. An exhaust pipe 10, which feeds the exhaust gases produced by the combustion to an exhaust system, is connected to the exhaust manifold 5. The exhaust pipes 10 emit the gases produced by the combustion into the atmosphere and normally comprises at least one catalyzer 11 and at least one muffler (not shown) arranged downstream of the catalyzer 11. Those having ordinary skill in the art will appreciate from the description that follows that the internal combustion engine 1 may include more than four cylinders 3 and that these cylinders may be arranged in-line, in a V-shape, or in any other suitable configuration without departing from the scope of the invention. In addition, the internal combustion engine 1 may include other components as are commonly known in the related art.

The supercharging system 2 of the internal combustion engine 1 comprises a turbocharger 12 provided with a turbine 13, which is arranged along the exhaust pipe 10 in order to rotate at high speed under the bias of the exhaust gases expelled from the cylinders 3, and a supercharger 14, which is arranged along the intake pipe 6 and is mechanically connected to the turbine 13 in order to be rotatably fed by the turbine 13 itself and thus increase the pressure of the air fed into the intake pipe 6.

A bypass pipe 15 is provided along the exhaust pipe 10. The bypass pipe 15 is connected in parallel to the turbine 13 so that the ends thereof are connected upstream and downstream of the turbine 13 itself. A wastegate 16 is arranged along the bypass pipe 15 and is adapted to regulate the exhaust gas flow rate through the bypass pipe 15 and is controlled by a pneumatic actuator 17. A bypass pipe 18 is provided along the exhaust pipe 10 and is connected in parallel to the supercharger 14 so that the ends thereof are connected upstream and downstream of the supercharger 14 itself. A Poff valve 19 is arranged along the bypass pipe 18 and is adapted to regulate the exhaust gases which flow through the bypass pipe 18 and is controlled by an electric actuator 20.

The internal combustion engine 1 is controlled by an electronic control unit 21, which governs the operation of all the components of the internal combustion engine 1 including the supercharging system 2. In particular, the electronic control unit 21 controls the actuators 17 and 20 of the wastegate 16 and of the Poff valve 19. The electronic control unit 21 is connected to sensors 22, which measure the temperature and the pressure along the intake pipe 6 upstream of the supercharger 14, to sensors 23, which measure the temperature and pressure along the intake pipe 6 upstream of the butterfly valve 8, and to sensors 24, which measure the temperature and pressure inside the intake manifold 4. Furthermore, the electronic control unit 21 is connected to a sensor 25, which measures the angular position (and thus the rotation speed) of a crankshaft of the internal combustion engine 1, and to a sensor 26, which measures the timing of the intake and/or exhaust valves.

Figure 2:
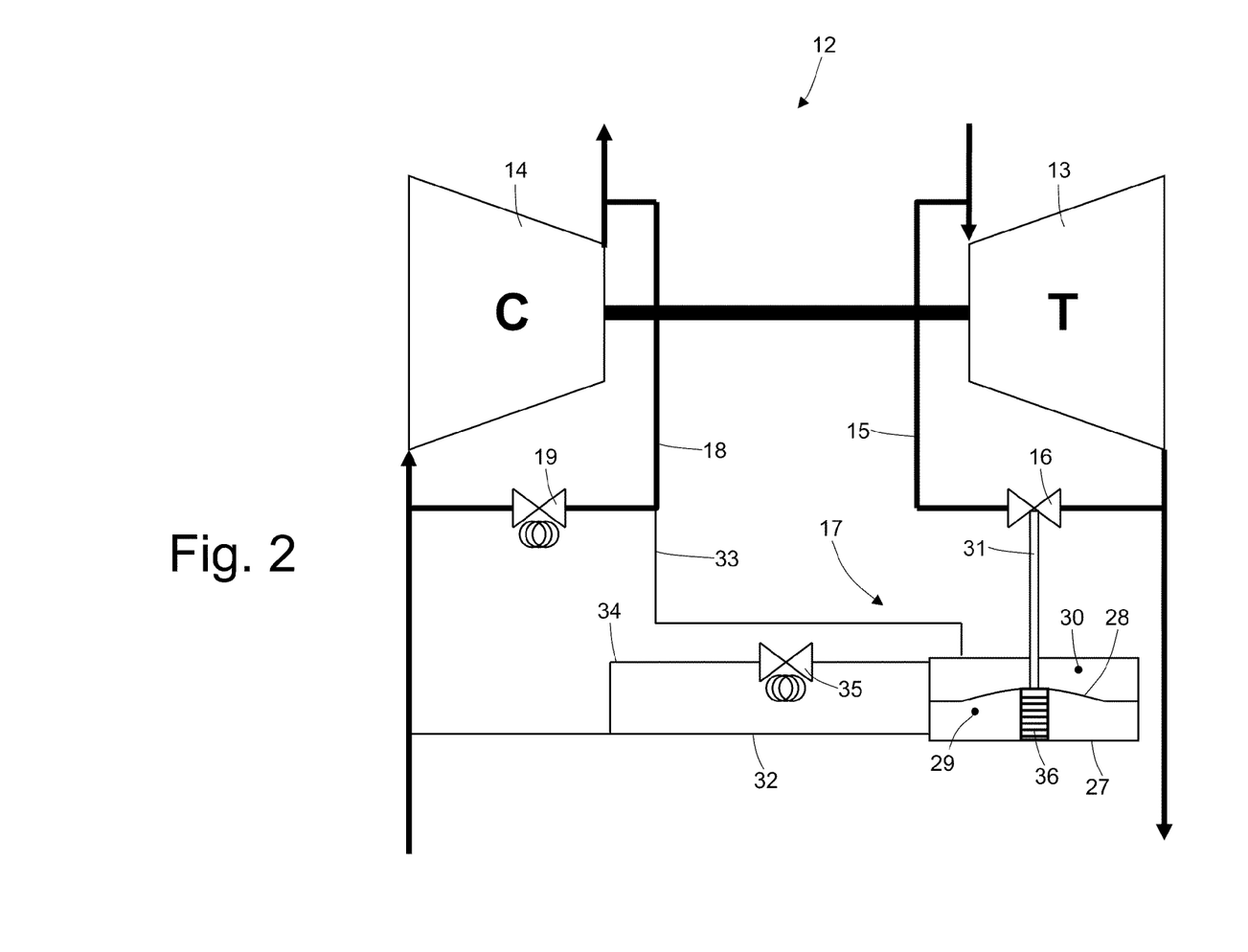
FIG. 2 is a diagrammatic view of a pneumatic actuator of the wastegate.

As shown in FIG. 2, the pneumatic actuator 17 of the wastegate 16 includes a sealed shell 27, which externally supports a flexible membrane 28. The membrane 28 divides the sealed shell 27 into two reciprocally isolated chambers 29 and 30. The flexible membrane 28 is mechanically connected to a rigid rod 31, which controls the wastegate 16 for controlling the opening and closing of the wastegate 16 itself. Chamber 29 is connected by means of a pipe 32 to atmospheric pressure (taken upstream of the supercharger 14), while chamber 30 is connected by means of a pipe 33 to supercharging pressure (taken downstream of the supercharger 14) and is connected by means of a pipe 34 to atmospheric pressure (taken upstream of the supercharger 14). The pipe 34 is not free, but it is instead regulated by a regulating solenoid valve 35, which is adapted to divide the pipe 34 between a closing position, in which the pipe 34 is completely closed, and a maximum opening position.

A contrast spring 36, which is compressed between a wall of the shell 27 and the flexible membrane 28, and which rests on the flexible membrane 28 on the side opposite to the rod 31, is arranged in the chamber 29. When the pressure difference between chamber 30 and chamber 29 is lower than an intervention threshold (determined by the preload of the contrast spring 36), the rod 31 maintains the wastegate 16 in a completely closed position, while when the pressure difference between chamber 30 and chamber 29 is higher than the intervention threshold, the contrast spring 36 starts to compress under the bias of the flexible membrane 28, and is thus deformed, determining a movement of the rod 31, which consequently moves the wastegate 16 towards the opening position. By controlling the regulating solenoid valve 35, the second chamber 30 can be connected to atmospheric pressure with a variable introduction gap, thus the pressure difference between the two chambers 29 and 30 can be regulated. This pressure difference, in turn, determines the opening or closing of the wastegate 16.

It is worth noting that until the difference between the supercharging pressure P and the atmospheric pressure $P_{atm}$ exceeds the intervention threshold (which is equal to the preload generated by the contrast spring 36 divided by the area of the flexible membrane 28), the wastegate 16 cannot be opened by the action which is exerted by the regulating solenoid valve 35. The regulating solenoid valve 35 can only reduce and not increase the pressure difference between supercharging pressure P and atmospheric pressure $P_{atm}$. Due to construction dispersion, thermal drift and time drift, the preload generated by the contrast spring 36 is known only with a rather high uncertainty (in the order of ±20%). Consequently, three operating zones (shown in FIG. 3) are identified for the pneumatic actuator 17 of the wastegate 16 according to the supercharging pressure P (or rather according to the difference between supercharging pressure P and atmospheric pressure $P_{atm}$): a zone A operating at low supercharging pressure P (i.e. at a low supercharging ratio RP), in which the wastegate 16 remains substantially closed regardless of the action of the regulating solenoid valve 35; a zone B operating at intermediate supercharging pressure P (i.e. at an intermediate supercharging ratio RP), in which there is uncertainty concerning the position of the wastegate 16 and the possibility of controlling the position of the wastegate 16 by means of the regulating solenoid valve 35; and a zone C operating at high supercharging pressure P (i.e. at a high supercharging ratio RP), in which the position of the wastegate 16 is controllable by the regulating solenoid valve 35.

Among other things, the electronic control unit 21 controls the position of the wastegate 16 by controlling the regulating solenoid valve 35 of the pneumatic actuator 17. The control method used by the electronic control unit 21 for controlling the position of the wastegate 16 by controlling the regulating solenoid valve 35 is described below.

Figure 4:
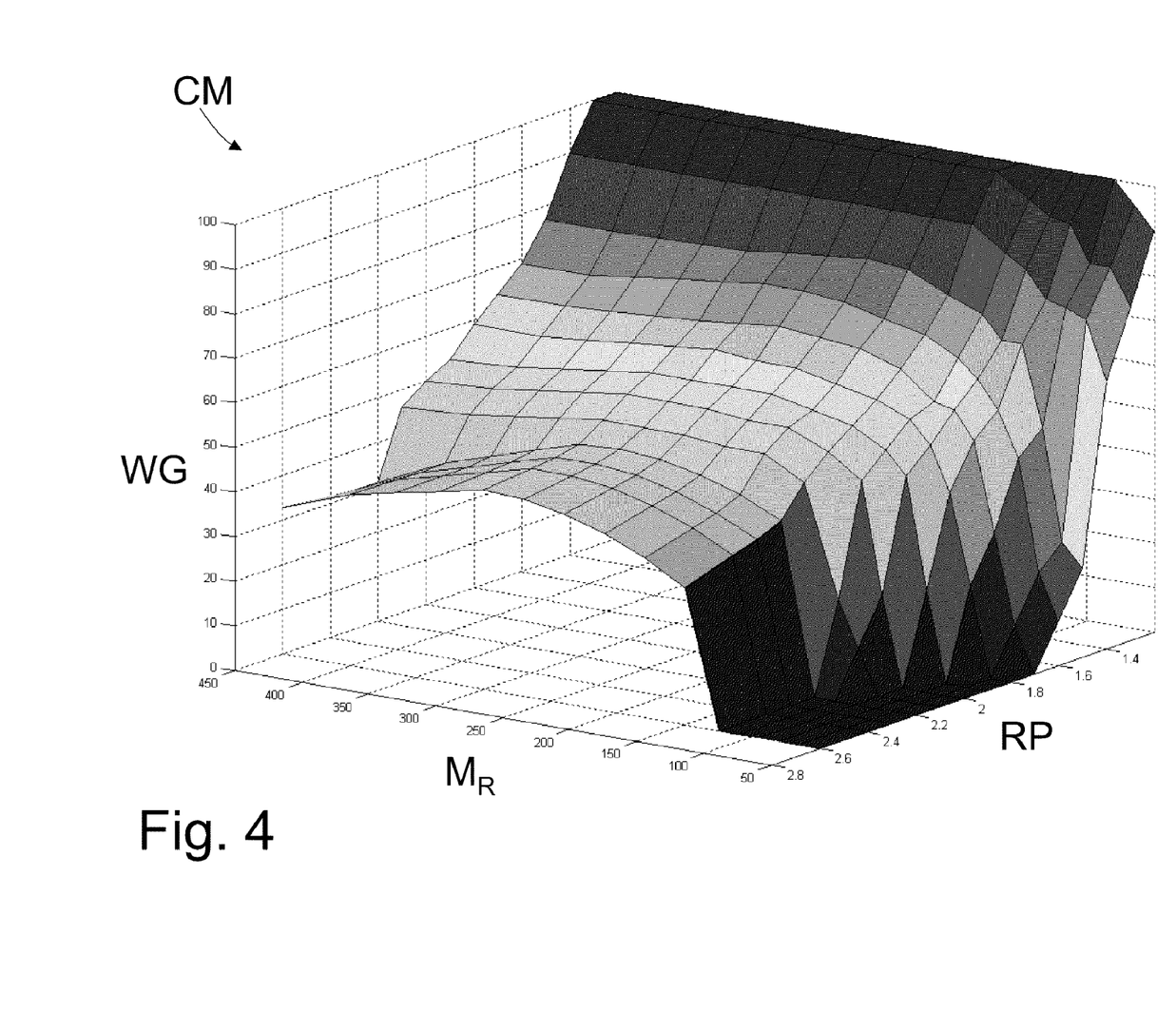
FIG. 4 is a chart which illustrates an experimental control map.

During a design stage of the internal combustion engine 1, a control law CL is determined experimentally and provides an objective opening WG of the regulating solenoid valve 35 of the wastegate 16 according to a supercharging pressure P (or rather according to a supercharging ratio RP which is equal to the supercharging pressure P and atmospheric pressure $P_{atm}$ and is equivalent to the supercharging pressure P) and to a reduced mass flow rate $M_R$ of the supercharger 14. In other words, the control law CL supplies the opening WG of the regulating solenoid valve 35 of the wastegate 16, which should allow a desired supercharging pressure P to be obtained (or rather a desired supercharging ratio RP) in presence of a given reduced mass flow rate $M_R$. According to one embodiment shown by way of example in FIG. 4, the control law CL consists of an experimental map (i.e. a table or rather a matrix) which, as apparent in FIG. 4, is strongly linear. Alternatively, the control law CL may consist of an arithmetical function. The control law CL is stored in a memory of the electronic control unit 21 to be used as described below.

In use, during normal operation of the internal combustion engine 1, the electronic control unit 21 measures the actual supercharging pressure P (i.e. the air pressure along the intake pipe 6 downstream of the supercharger 14), measures or estimates (in known manner) atmospheric pressure $P_{atm}$, and estimates (in known manner) the actual reduced mass air flow $M_R$ of the supercharger 14. Furthermore, during normal operation of the internal combustion engine 1, the electronic control unit 21 determines in known manner an objective supercharging pressure $P_{obj}$, which must be pursued by controlling, if needed, the regulating solenoid valve 35 of the wastegate 16. In order to control the regulating solenoid valve 35 of the wastegate 16, the electronic control unit 21 determines an objective position $WG_{obj}$ of the regulating solenoid valve 35 of the wastegate 16, which is generally actuated using an open loop control.

Figure 5:
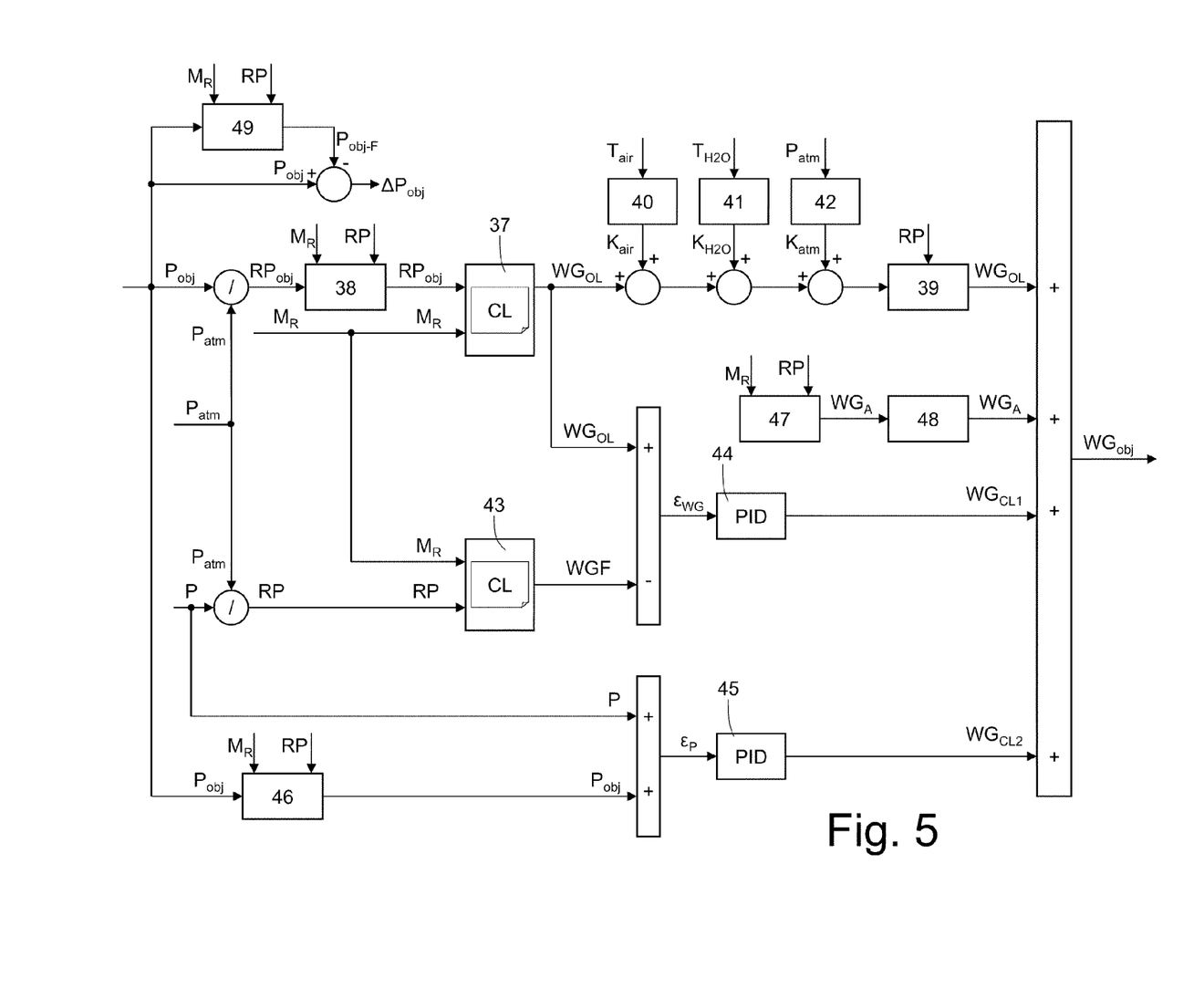
FIG. 5 is a block chart of a control logic of the wastegate.

As shown in FIG. 5, the objective position $WG_{obj}$ of the regulating solenoid valve 35 of the wastegate 16 is calculated by algebraically adding four contributions while taking the sign into account: an open loop contribution $WG_{OL}$, a closed loop contribution $WG_{CL1}$, a closed loop contribution $WG_{CL2}$, and an adaptive contribution $WG_A$.

The open loop contribution $WG_{OL}$ is determined using the control law CL. An objective compression ratio $RP_{obj}$ (equal to the ratio between objective supercharging pressure $P_{obj}$ and atmospheric pressure $P_{atm}$ and equivalent to the objective supercharging pressure $P_{obj}$) is determined according to the objective supercharging pressure $P_{obj}$. Thus the objective compression ratio $RP_{obj}$ and the reduced mass flow rate $M_R$ are supplied to a calculation block 37, which by using the control law CL provides the open loop contribution $WG_{OL}$.

Preferably, before being supplied to the calculating block 37, the objective compression ratio $RP_{obj}$ is filtered by means of a first-order low-pass filter 38 to reduce the variation rapidity. In other words, the objective compression ratio $RP_{obj}$ is filtered by means of the low-pass filter 38 so as to slow down the evolution of the objective compression ratio $RP_{obj}$, thus "rounding off" possible step variations. The function of the low-pass filter 38 is to make the evolution of the objective compression ratio $RP_{obj}$ more "real" (i.e. more adherent to what occurs in reality), because it is apparent that step (or in all case very fast) variations of the actual supercharging pressure P are not possible due to evident physical limits caused by the involved inertia. According to one embodiment, a cutoff frequency of the low-pass filter 38 is determined according to the reduced mass flow rate $M_R$ of the supercharger 14 and of the actual supercharging ratio RP according to an experimentally determined law.

According to one embodiment, the open loop contribution $WG_{OL}$ supplied by the calculation block 37 is first compensated by means of three compensation parameters $K_{atm}$, $K_{H2O}$ and $K_{air}$ and then filtered by means of a first-order low-pass filter 39 to reduce the variation rapidity. The compensation parameter $K_{air}$ is determined by a calculation block 40 according to the aspirated air temperature $T_{air}$ and using a linear equation having experimentally determined coefficients. The compensation block $K_{H2O}$ is determined by the calculation block 41 according to the temperature $T_{H2O}$ of a cooling liquid of the internal combustion engine 1 and using a linear equation having experimentally determined coefficients. The compensation parameter $K_{atm}$ is determined by a calculation block 42 according to the atmospheric pressure $P_{atm}$ and using a linear equation having experimentally determined coefficients. The coefficients of the linear equation which provides the compensation parameter $K_{atm}$ according to the atmospheric pressure $P_{atm}$ may not be constant but instead vary according to the reduced mass flow rate $M_R$ of the supercharger 14 and the actual supercharging ratio RP according to an experimentally determined law.

The open loop contribution $WG_{OL}$ is filtered by means of the low-pass filter 39 so as to slow down the evolution of the open loop contribution $WG_{OL}$, thus "rounding off" possible step variations. The function of the low-pass filter 39 is to make the evolution of the open loop contribution $WG_{OL}$ more "real" (i.e. more adherent to what occurs in reality), because it is apparent that step (or in all case very fast) variations of the position of the regulating of the solenoid valve 35 are not possible due to evident physical limits caused by the involved inertia. According to one embodiment, a cutoff frequency of the low-pass filter 39 is determined according to the actual supercharging ratio RP according to an experimentally determined law. According to one embodiment, the open loop contribution $WG_{OL}$ is asymmetrically filtered by means of the low-pass filter 39. The open loop contribution $WG_{OL}$ is filtered by the low-pass filter 39 only when the open loop contribution $WG_{OL}$ varies to open the wastegate 16 and not when the open loop contribution $WG_{OL}$ varies to close the wastegate 16. In this manner, the intervention of the supercharger 14 is faster (more reactive) favoring response promptness of the internal combustion engine 1 (thus reducing turbolag), while the stopping of the supercharger 14 is smoother. It is worth noting that when maximum performance is sought, an "abrupt" reaction of the internal combustion engine 1 is acceptable (and in some cases even desired), while in other cases a "smooth" behavior, i.e. without excessively rapid, forceful interventions, is desired. It is worth noting that by virtue of the presence of the low-pass filter 39 possible oscillating phenomena in the pneumatic actuator 17 of the wastegate 16 are either eliminated or greatly attenuated. Such a result is obtained by virtue of the fact that the action of the low-pass filter 39 avoids providing excessively rapid oscillations which could set off oscillatory phenomena to the flexible membrane 28 and to the contrast spring 36.

The closed loop contribution $WG_{CL1}$ of the objective position $WG_{obj}$ of the regulating solenoid valve 35 of the wastegate 16 is obtained using a virtual position WGF of the wastegate 16 (thus a control magnitude which has no precise correspondence with physical reality) as feedback variable, which virtual position WGF is determined not by means of a direct measurement by a real measuring sensor but by using the control law CL as measuring sensor. In other words, a calculation block 43 provides the virtual position WGF of the wastegate 16 by applying the control law CL according to the actual supercharging pressure P (or rather the actual supercharging ratio RP) and the reduced mass flow rate $M_R$ of the supercharger 14. Thus, the virtual position WGF of the wastegate 16 corresponds to the position that the wastegate should have according to control law CL (and thus affected by all the errors of control law CL) in conjunction with the actual supercharging ratio RP and the actual reduced flow rate $M_R$ of the compressor 14. The virtual position WGF of the wastegate 16 is compared with the open loop contribution $WG_{OL}$ which corresponds to the position that the wastegate 16 should have according to the control law CL (and thus affected by all the errors of the control law CL) in conjunction with the actual compression ratio $RP_{obj}$ and the actual reduced flow mass $M_R$ of the supercharger 14. In other words, the open loop contribution $WG_{OL}$ is an objective of the virtual position WGF because it is calculated using the objective compression ratio $RP_{obj}$. In particular, a position error $\epsilon_{WG}$ is calculated by calculating the difference between the open loop contribution $WG_{OL}$ of the objective position $WG_{obj}$ of the regulating solenoid valve 35 of the wastegate 16 and the virtual position WGF of the wastegate 16 and such a positioning error $\epsilon_{WG}$ is supplied to a PID regulator 44 which attempts to cancel the position error $\epsilon_{WG}$ itself.

The fact of comparing two values (the open loop contribution $WG_{OL}$ which represents an objective of the virtual position WGF and the virtual position WGF) obtained by the control law CL allows to compensate the errors of the control law CL and to linearize the strongly non-linear behaviour of the wastegate 16. In this manner, the PID regulator 44 may work more stably and the calibration of the control parameters (i.e. of the proportional, integrative, derivative coefficients and saturation thresholds) of the PID regulator 44 is relatively simple. Furthermore, the control loop of the PID regulator 44 is self-compensated according to the aspirated air temperature $T_{air}$, to the temperature $T_{H2O}$ of a cooling liquid of the internal combustion engine 1, and to atmospheric pressure $P_{atm}$.

The closed loop contribution $WG_{CL2}$ of the objective position $WG_{obj}$ of the regulating solenoid valve 35 of the wastegate 16 is determined by using the supercharging pressure P as feedback variable. Thus, a pressure error $\epsilon_P$ is calculated by determining the difference between the objective supercharging pressure $P_{obj}$ and the actual supercharging pressure P and the pressure error $\epsilon_{WG}$ is supplied to a PID regulator 45 which attempts to cancel the pressure error $\epsilon_{WG}$ itself.

Preferably, before being compared with the actual supercharging pressure P, the objective supercharging pressure $P_{obj}$ is filtered by means of a first-order low-pass filter 46 to reduce variation rapidity. In other words, the objective supercharging pressure $P_{obj}$ is filtered by means of the low-pass filter 46 so as to slow down the evolution of the objective supercharging pressure $P_{obj}$ by "rounding off" possible step variations. The function of the low-pass filter 46 is to make the evolution of the objective supercharging pressure $P_{obj}$ more "real" (i.e. more adherent to what occurs in reality), because it is apparent that step (or in all case very fast) variations of the actual supercharging pressure P are not possible due to evident physical limits caused by the involved inertia. According to one embodiment, a cutoff frequency of the low-pass filter 46 is determined according to the reduced mass flow rate $M_R$ of the supercharger 14 and of the actual supercharging ratio RP according to an experimentally determined law.

In order to avoid negative interferences between the action of the regulator 44 and the action of the regulator 45, the dynamic of the regulator 44 is different from the dynamic of the regulator 45. In particular, the regulator 44 is essentially proportional and derivative (i.e. has high proportional and derivative coefficients and a low integral coefficient) in order to be ready (i.e. to work rapidly), while the regulator 45 is substantially integral (i.e. has low proportional and derivative coefficients and a high integral coefficient) in order to guarantee the convergence between the objective supercharging pressure $P_{obj}$ and the actual supercharging pressure P. Therefore, the regulator 44 is used to react rapidly and promptly to objective supercharging pressure variations $P_{obj}$, while the regulator 45 is used to make the actual supercharging pressure P converge with the objective supercharging pressure $P_{obj}$ at the end of the transient.

Figure 6:
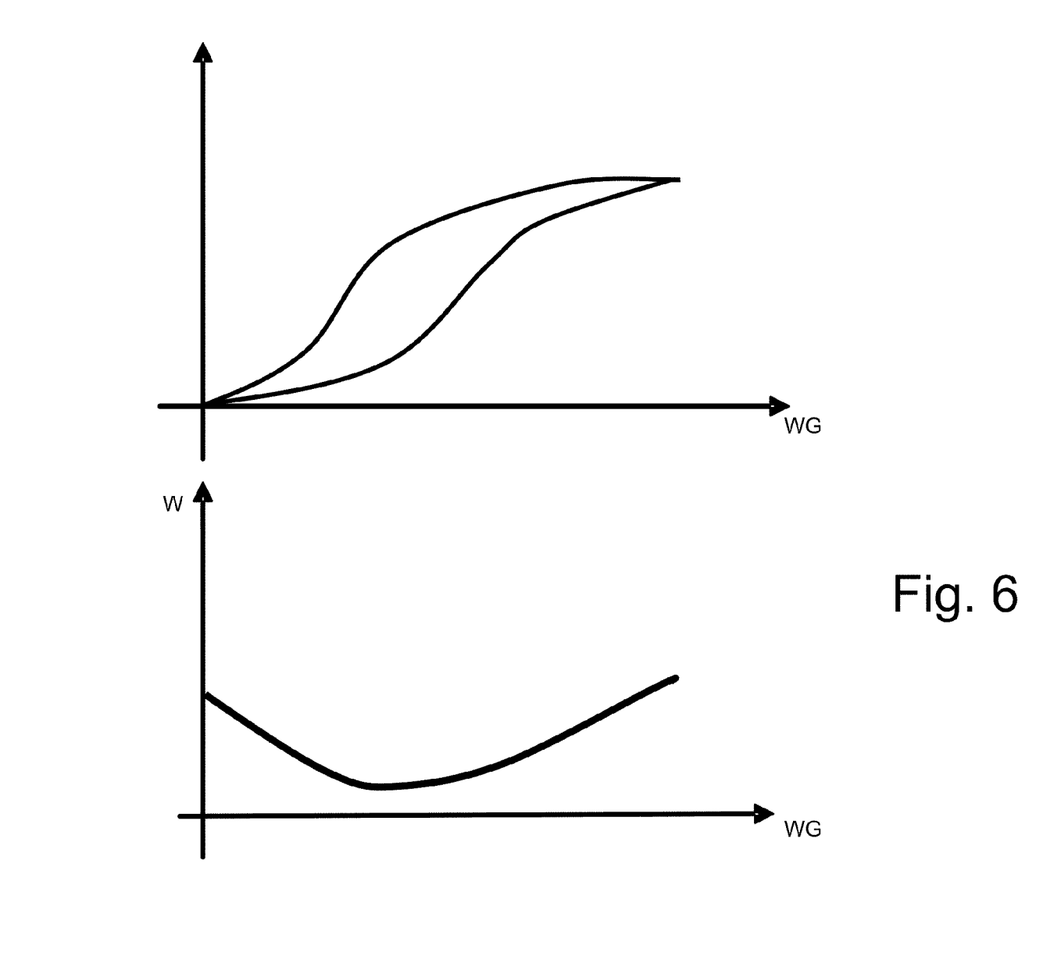
FIG. 6 is a chart which illustrates the weight variation of an adaptive contribution according to the position of the wastegate.

The adaptive contribution $WG_A$ of the objective position $WG_{obj}$ of the regulating solenoid valve 35 of the wastegate 16 is substantially a "historical memory" of the previous actuations of the wastegate 16 and takes the control interventions made in the past into account. The adaptive contribution $WG_A$ is stored in a memory 47 of the electronic control unit 21 and is cyclically updated when the turbocharger 12 is at stable speed (e.g. when the reduced mass flow rate $M_R$ of the supercharger 14 and the supercharging ratio RP remain appropriately constant for at least one interval of predetermined time) and using an integral term of the PID regulator 45 and/or of the PID regulator 44. The adaptive contribution $WG_A$ is substantially equal to an "average" of the past integral terms of the PID regulator 45 and/or of the PID regulator 44 at stabilized running conditions of the turbocharger 12. The adaptive contribution $WG_A$ stored in the memory 47 is updated when the turbocharger 12 is in stabilized running conditions, by using the integral term of the PID regulator 45 and/or the PID regulator 44 weighed by means of a weight W which substantially depends on an actual position WG of the regulating solenoid valve 35 of the wastegate 16 so that the weight W is minimum when the hysteresis of the wastegate 16 is maximum (as shown in FIG. 6). In this manner, adaptivity is always gradual (i.e. the last integral term of the PID regulator 45 and/or of the PID regulator 44 cannot upset the adaptive contribution $WG_A$ stored in the memory 47) and loading values distorted by the hysteresis is avoided in the adaptive contribution $WG_A$.

Generally, the adaptive contribution $WG_A$ varies according to the reduced mass flow rate $M_R$ of the supercharger 14 and of the supercharging ratio RP. Furthermore, the adaptive contribution $WG_A$ is filtered by means of a first-order low-pass filter 48 to reduce variation rapidity. In other words, the adaptive contribution $WG_A$ is not supplied abruptly but is supplied gradually to avoid step interventions which never correspond to the physical reality and thus to favor control convergence. According to one embodiment, the cutoff frequency of the low-pass filter 48 is constant. Alternatively, the cutoff frequency of the low-pass filter 48 could be varied according to the reduced mass flow rate $M_R$ of the supercharger 14 and of the supercharging ratio RP.

Figure 3:
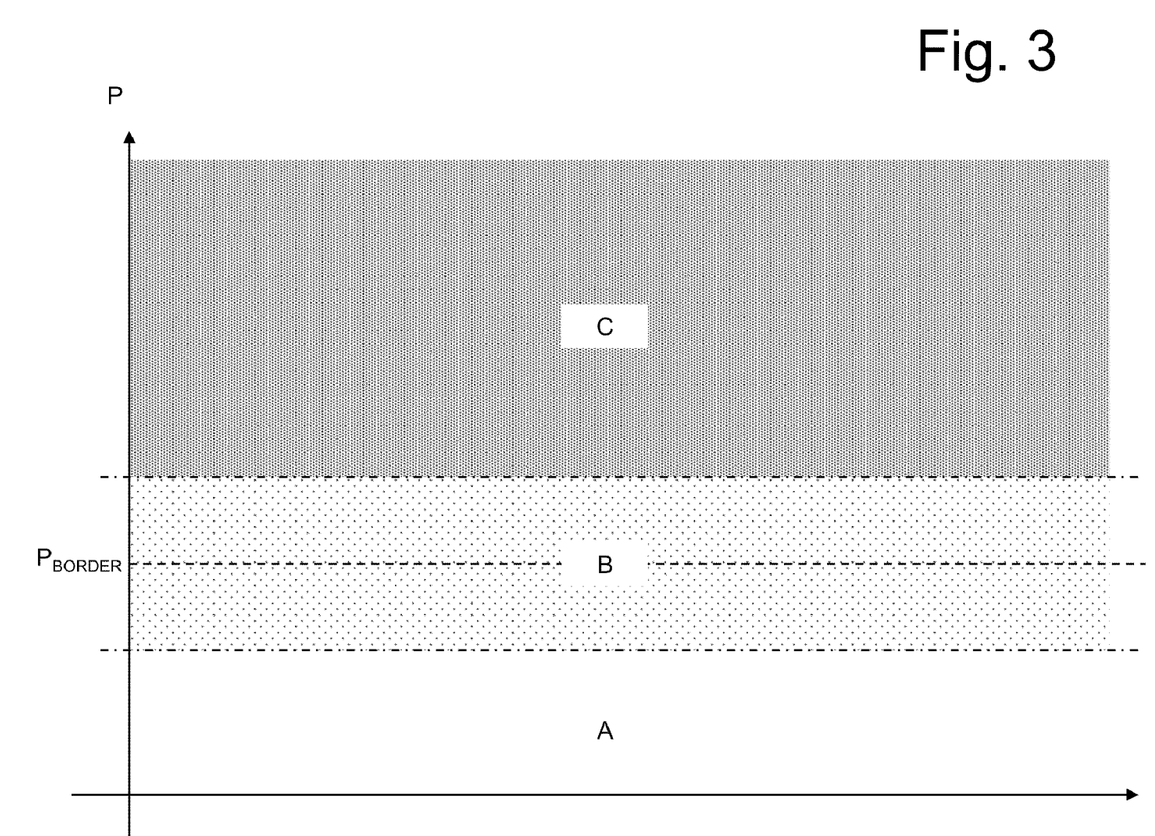
FIG. 3 is a chart illustrating different opening zones of the pneumatic actuator of the wastegate according to the supercharging pressure.

With reference to FIG. 3, the electronic control unit 21 divides the operation field of the wastegate 16 according to the actual supercharging pressure P (or rather according to the difference between supercharging pressure P and atmospheric pressure $P_{atm}$) and in three different operating zones: a zone A operating at low supercharging pressure P (named "NOT-ACTIVE"), in which the wastegate 16 remains substantially closed regardless of the action of the regulating solenoid valve 35; a zone B operating at intermediate supercharging pressure P (named "PRE-ACTIVE"), in which there is uncertainty concerning the position of the wastegate 16 and the possibility of controlling the position of the wastegate 16 by means of the regulating solenoid valve 35; and a zone C operating at high supercharging pressure P (named "ACTIVE"), in which the position of the wastegate 16 is controllable by the regulating solenoid valve 35.

In use, the electronic control unit 21 avoids any type of control of the regulating solenoid valve 35 when the difference between the actual supercharging pressure P and atmospheric pressure $P_{atm}$ is in zone A operating at low supercharging pressure. Furthermore, in use, the electronic control unit 21 differentiates the type of control according to whether the difference between the actual supercharging pressure P and atmospheric pressure $P_{atm}$ is in zone B operating at intermediate supercharging pressure or in zone C operating at high supercharging pressure.

According to a first embodiment, operating parameters of the PID regulators 44 and 45 are differentiated according to whether the difference between the actual supercharging pressure P and atmospheric pressure $P_{atm}$ is in zone B operating at intermediate supercharging pressure or in zone C operating at high supercharging pressure. In particular, in zone B operating at intermediate supercharging pressure a slower control is used with respect to the control used in zone C operating at high supercharging pressure. Consequently, in zone B operating at intermediate supercharging pressure smaller proportional, integrative and/or derivative coefficients of the PID regulators 44 and 45 are used with respect to the similar coefficients used in zone C operating at high supercharging pressure, and in zone B operating at intermediate supercharging pressure lower saturation thresholds are used with respect to the similar saturation thresholds used in zone C operating at high supercharging pressure. A saturation threshold determines the freezing, i.e. the blocking, of the further increase of a corresponding proportional, integral or deviate terms when the terms itself exceeds the saturation threshold.

According to a different embodiment, only the open loop control is used when the difference between the actual supercharging pressure P and the atmospheric pressure $P_{atm}$ is in zone B operating at intermediate supercharging pressure, and thus the closed loop contributions $WG_{CL1}$ and $WG_{CL2}$ are completely reset when the difference between the actual supercharging pressure P and atmospheric pressure $P_{atm}$ is in zone B operating at intermediate supercharging pressure. According to a further embodiment, when the difference between the actual supercharging pressure P and the atmospheric pressure $P_{atm}$ is in zone B operating at intermediate supercharging pressure, a predetermined constant value, which is independent from the objective supercharging pressure $P_{obj}$, is assigned to the objective position $WG_{obj}$ of the regulating solenoid valve 35 of the wastegate 16. In other words, the four contributions $WG_{OL}$, $WG_{CL1}$, $WG_{CL2}$ and $WG_A$ are ignored and the objective position $WG_{obj}$ of the regulating solenoid valve 35 of the wastegate 16 is always constant independent from the objective supercharging pressure $P_{obj}$.

The integral term of the PID regulators 44 and 45 contains in itself a "memory" of the errors which occurred in the immediate past. Thus when variations to the surrounding conditions occur (e.g. passing from zone C operating a high supercharging pressure to zone B operating at intermediate supercharging pressure, or in case of rapid variation, i.e. of strong transient, of the objective supercharging pressure $P_{obj}$), the "memory" of the errors which occurred in the immediate past contained in the integral term of the PID regulators 44 and 45 may have negative effects because it represents a situation which is no longer present. In order to avoid the negative effects of the "memory" of the errors which occurred in the immediate past contained in the integral term of the PID regulators 44 and 45, the electronic control unit 21 resets the integral term of the PID regulators 44 and 45 when the actual supercharging pressure P decreases passing from zone C operating at high supercharging pressure to zone B operating at intermediate supercharging pressure. Furthermore, the electronic control unit 21 resets (or possibly "freezes", i.e. prevents a further growth of) each integral terms of the PID regulators 44 and 45 in case of rapid variation, i.e. high transient, of the objective supercharging pressure $P_{obj}$ if the integral term itself is high, i.e. higher than the absolute value of predetermined threshold. In other words, when a rapid variation of the objective supercharging pressure $P_{obj}$ and an integral term of the PID regulators 44 and 45 is higher in absolute value that a predetermine threshold value, then the integral term itself is either reset or frozen (i.e. is not varied until the end of the high transient).

In order to establish when a high transient of the objective supercharging pressure $P_{obj}$ is present (i.e. a rapid variation of the objective supercharging pressure $P_{obj}$) the electronic control unit 21 compares the objective supercharging pressure $P_{obj}$ with the objective supercharging pressure $P_{obj-F}$ filtered by a low-pass filter 49 to determine a gradient $\Delta P_{obj}$ of an objective supercharging pressure $P_{obj}$ which indicates the variation speed of the objective supercharging pressure $P_{obj}$. In other words, the gradient $\Delta P_{obj}$ of the objective supercharging pressure $P_{obj}$ is calculated by calculating the difference between the objective supercharging pressure $P_{obj}$ and the objective supercharging pressure $P_{obj-F}$ filtered by the low-pass filter 49. When the gradient $\Delta P_{obj}$ of the target supercharging pressure $P_{obj}$ is higher than a threshold value, then the electronic control unit 21 establishes the presence of a high transient of the target supercharging pressure $P_{obj}$ (i.e. of a rapid variation of the target supercharging pressure $P_{obj}$) and thus resets (or possibly "freezes") the integral term of the PID regulators 44 and 45. Such a threshold value may be according to the supercharging ratio RP and the reduced mass flow rate $M_R$ of the supercharger 14. According to one embodiment, a cutoff frequency of the low-pass filter 49 is determined according to the reduced mass flow rate $M_R$ of the supercharger 14 and of the actual supercharging ratio RP according to an experimentally determined law.

According to another embodiment, when the actual supercharging pressure P passes from zone B operating at intermediate supercharging pressure to zone C operating at high supercharging pressure the electronic control unit 21 intervenes on the low-pass filters 46 and 49 using the actual supercharging pressure.

According to a possible embodiment, the electronic control unit 21 learns a border supercharging pressure $P_{BORDER}$ (shown in FIG. 3), under which the wastegate 16 remains substantially closed regardless of the control action of the regulating solenoid valve 35, and thus establishes the borders of zone B operating at intermediate supercharging pressure according to the difference between the border supercharging pressure $P_{BORDER}$ and atmospheric pressure $P_{atm}$ (typically zone B operating a intermediate supercharging pressure is centered on the difference between the border supercharging pressure $P_{BORDER}$ and atmospheric pressure $P_{atm}$). In other words, instead of using the design border supercharging pressure $P_{BORDER}$ which has a very high uncertainty (indicatively ±20%), the electronic control unit learns the real border supercharging pressure $P_{BORDER}$ to attempt to reduce zone B operating at intermediate supercharging pressure to the minimum. It is worth noting that zone B operating an intermediate supercharging pressure can never be eliminated (i.e. flow rate at partially zero amplitude), because the learning of the real border supercharging pressure $P_{BORDER}$ has in all cases a given error margin and in all cases the border supercharging pressure $P_{BORDER}$ is affected by thermal drift and time drift.

In order to learn the border supercharging pressure $P_{BORDER}$ the electronic control unit 21 completely closes the regulating solenoid valve 35 of the wastegate 16 for a given interval of learning time in which the reduced mass flow rate $M_R$ of the supercharger 14 exceeds a predetermined threshold value. The border supercharging pressure $P_{BORDER}$ is substantially assumed as equal to the actual maximum supercharging pressure P during the interval of learning time.

According to one embodiment, the electronic control unit 21 varies the integral coefficients of the PID regulators 44 and 45 according to the pressure error $\epsilon_P$, so as to vary the control features according to variations of the pressure error $\epsilon_P$. In particular, the electronic control unit 21 varies the integral coefficients of the PID regulators 44 and 45 in manner inversely proportional to the pressure error $\epsilon_P$ so that the higher the integral coefficients of the PID regulators 44 and 45, the smaller the pressure error $\epsilon_P$, and varies the proportional coefficients of the PID regulators 44 and 45 in manner directly proportional to the pressure error $\epsilon_P$ so that the higher the proportional coefficients of the PID regulators 44 and 45, the higher the pressure error $\epsilon_P$. In other words, the integral term of the PID regulators 44 and 45 (directly proportional to the integral coefficients of the PID regulators 44 and 45) is used to guarantee the convergence between the actual supercharging pressure P and the objective supercharging pressure $P_{obj}$, but such a convergence is reached in terms of a transient when the pressure error $\epsilon_P$ is relatively small. At the beginning of the transient when the pressure error $\epsilon_P$ is higher, the integral terms of the PID regulators 44 and 45 may generate oscillations and thus in order to avoid such a risk the integral coefficients of the PID regulators 44 and 45 are reduced at the beginning of the transient when the pressure error $\epsilon_P$ is high.

The opposite applies to the proportional terms of the PID regulators 44 and 45 (directly proportional to the proportional and derivative coefficients of the PID regulators 44 and 45), which must be higher when the pressure error $\epsilon_P$ is high to ensure response speed and must be lower when the pressure error $\epsilon_P$ is low to ensure convergence.

In the above described low-pass filters 38, 46 and 49, the cutoff frequency is determined according to the reduced mass flow rate $M_R$ of the supercharger 14 and of the actual supercharging pressure RP. According to an equivalent embodiment, the cutoff frequency is determined according to the rotation speed of the internal combustion engine 1 and according to a gear engaged in a transmission which receives motion from the internal combustion engine 1. In this regard, it is worth noting that the dynamic of the supercharger 12 clearly varies according to the engaged gear, because the increase of revolution speed of the internal combustion engine 1 is rapid in lower gears, thus the increase of speed of revolution of the supercharger 12 is equally rapid. Instead, in high gears, the increase of revolution speed of the internal combustion engine 1 is slow, thus the increase of speed of revolution of the supercharger 12 is equally slow.

Similarly, the threshold value with which the gradient $\Delta P_{obj}$ of the objective supercharging pressure $P_{obj}$ is compared to establish if a high transient of the objective supercharging pressure $P_{obj}$ is present may depend on the reduced mass flow rate $M_R$ of the supercharger 14 and the actual supercharging ratio RP or may depend on the rotation speed of the internal combustion engine 1 of a gear engaged in a transmission which receives motion from the internal combustion engine 1.

It should be further noted that the supercharging pressure P and the supercharging ratio RP are perfectly equivalent to one another, because the atmospheric pressure $P_{atm}$ is approximately constant and has a value approximating a unitary value. Thus using the supercharging ratio RP is equivalent to using the supercharging pressure P and vice versa. In the control chart shown in FIG. 5 and described above, the supercharging ratio RP is used, but according to an equivalent embodiment the supercharging pressure P may be used instead of the supercharging ratio RP.

In the embodiment described above, the control law CL provides an objective opening WG of the regulating solenoid valve 35 of the wastegate 16 according to a supercharging pressure P (or rather a supercharging ratio RP, which is equal to the supercharging pressure P and atmospheric pressure $P_{atm}$ and is equivalent to the supercharging pressure P) and of a reduced mass flow rate $M_R$ of the supercharger 14. According to an equivalent embodiment, the control law CL provides an objective opening WG of the regulating solenoid valve 35 of the wastegate 16 either according to a power delivered by the internal combustion engine 1 and a volumetric efficiency of the internal combustion engine 1, or according to a rotation speed of the internal combustion engine 1 and a volumetric efficiency. Obviously, different combinations of the parameters of the internal combustion engine 1 are possible.

Figure 7:
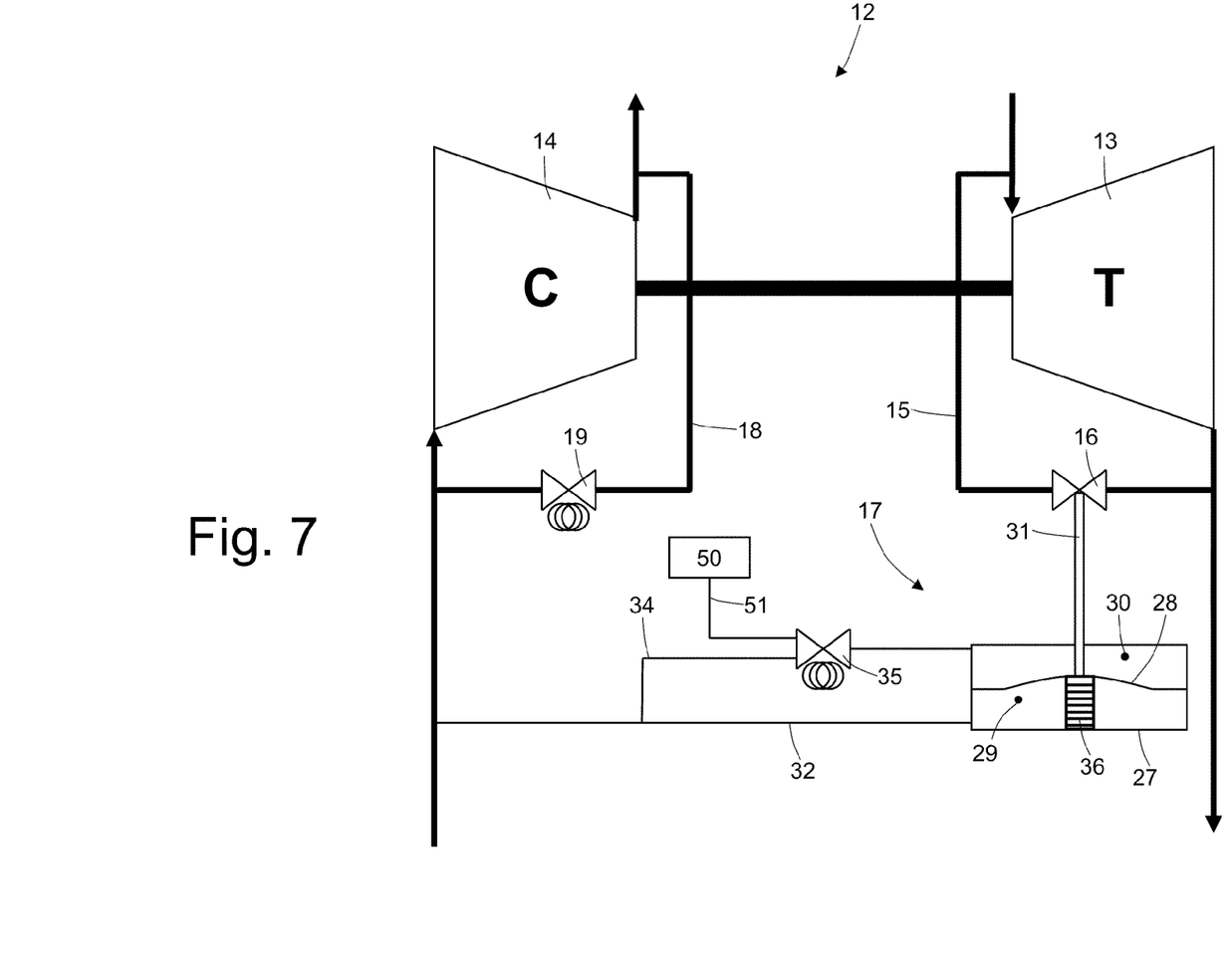
FIG. 7 is a diagrammatic view of a variant of the pneumatic actuator of the wastegate in FIG. 2.

According to a different embodiment shown in FIG. 7, the pneumatic actuator 17 no longer contemplates the pipe 33 which connects the chamber 30 to the supercharging pressure (taken upstream of the supercharger 14). Furthermore, the pneumatic actuator 17 comprises a vacuum source 50 (i.e. a vacuum pump) which is connected to the regulating solenoid valve 35 by means of a pipe 51. In this manner, the chamber 30 of the shell 27 is connectable by means of the regulating solenoid valve 35 to atmospheric pressure by means of the pipe 34 or to the source 50 by means of the pipe 51. In this manner, by controlling the regulating solenoid valve 35 a pressure even lower than atmospheric pressure can be imposed in the chamber 30. Then, the control of the position of the wastegate 16 is always active, i.e. with reference to FIG. 3, zone A in which the wastegate 16 is insensitive to the action of the regulating solenoid valve 35 no longer exists. In this embodiment, the control is always active because the wastegate 16 is always sensitive to the action of the regulating solenoid valve 35. In particular, in zone B the control is always closed loop and may have more reactive values to reduce the reply delay of the supercharger 12.

Preferably, in this embodiment, the wastegate 16 is normally open instead of being normally closed as in the embodiment shown in FIG. 2.

The control method of the wastegate 16 above described has many advantages. The control method of the wastegate 16 described above is simple and cost-effective to implement in a control unit of an internal combustion engine because it only uses measurements supplied by sensors which are always present in modern internal combustion engines and does not require either high calculation capacity or high memory capacity. Furthermore, the control method of the wastegate 16 described above allows to obtain a particularly robust control of the wastegate 16, ready and free from oscillations in all operating conditions.

The invention has been described in an illustrative manner. It is to be understood that the terminology which has been used is intended to be in the nature of words of description rather than of limitation. Many modifications and variations of the invention are possible in light of the above teachings. Therefore, the invention may be practiced other than as specifically described.

What is claimed is:

1. A method for controlling the wastegate (16) in a internal combustion engine (1) turbocharged by means of a turbocharger (12); the control method comprises the steps of:
determining, during a design phase, a control law (CL) which provides an objective opening of a controlling actuator (35) of the wastegate (16) according to the supercharging pressure (P);
determining an objective supercharging pressure ($P_{obj}$);
measuring an actual supercharging pressure (P);
determining a first open loop contribution ($WG_{OL}$) of an objective position ($WG_{obj}$) of the controlling actuator (35) of the wastegate (16) through the control law (CL) and according to the objective supercharging pressure ($P_{obj}$);
determining a second closed loop contribution ($WG_{CL1}$) of the objective position ($WG_{obj}$) of the controlling actuator (35) of the wastegate (16);
calculating the objective position ($WG_{obj}$) of the controlling actuator (35) of the wastegate (16) by adding the two contributions ($WG_{OL}$, $WG_{CL1}$);
controlling the controlling actuator (35) of the wastegate (16), so as to pursue the objective position ($WG_{obj}$) of the controlling actuator (35) of the wastegate (16);
dividing the operation field of the wastegate (16) into at least two different operation zones according to the difference between the actual supercharging pressure (P) and the atmospheric pressure ($P_{atm}$): an intermediate-supercharging-pressure operation zone (B) in which the position of the wastegate (16) and the possibility of controlling the position of the wastegate (16) by means of the controlling actuator (35) are uncertain, and a high-supercharging-pressure operation zone (C) in which the position of the wastegate (16) can be controlled by means of the controlling actuator (35); and differentiating the kind of control according to the fact that the difference between the actual supercharging pressure (P) and the atmospheric pressure ($P_{atm}$) is in the intermediate-supercharging-pressure operation zone (B) or in the high-supercharging-pressure operation zone (C).

2. The control method as set forth in claim 1 further including the steps of:
dividing the operation field of the wastegate (16) according to the difference between the actual supercharging pressure (P) and the atmospheric pressure ($P_{atm}$) also into a low-supercharging-pressure operation zone (A) in which the wastegate (16) remains substantially closed irrespective of the controlling action of the controlling actuator (35); and
avoiding any kind of control of the controlling actuator (35) when the difference between the actual supercharging pressure (P) and the atmospheric pressure ($P_{atm}$) is in the low-supercharging-pressure operation zone (A).

3. The control method as set forth in claim 1 further including the step of switching off the feedback controls zeroing the closed loop contributions ($WG_{CL1}$, $WG_{CL2}$) and using only the open loop control when the difference between the actual supercharging pressure (P) and the atmospheric pressure ($P_{atm}$) is in the intermediate-supercharging-pressure operation zone (B).

4. The control method as set forth in claim 1 further including the step of assigning to the objective position ($WG_{obj}$) of the controlling actuator (35) of the wastegate (16) a constant and predetermined value which is independent from the objective supercharging pressure ($P_{obj}$).

5. The control method as set forth in claim 1 further including the step of differentiating the operative parameters of the regulators (44, 45) according to the fact that the difference between the actual supercharging pressure (P) and the atmospheric pressure ($P_{atm}$) is in the intermediate-supercharging-pressure operation zone (B) or in the high-supercharging-pressure operation zone (C).

6. The control method as set forth in claim 5 further including the step of using in the intermediate-supercharging-pressure operation zone (B) a slower control with respect to the control used in the in the high-supercharging-pressure operation zone (C).

7. The control method as set forth in claim 5 further including the step of using in the intermediate-supercharging-pressure operation zone (B) proportional, integral and/or derivative coefficients of the regulators (44, 45) which are lower than the similar coefficients used in the high-supercharging-pressure operation zone (C).

8. The control method as set forth in claim 5 further including the step of using in the intermediate-supercharging-pressure operation zone (B) saturations thresholds which are lower than the similar saturation thresholds used in the high-supercharging-pressure operation zone (C).

9. The control method as set forth in claim 1 further including the step of zeroing the integral term of the regulators (44, 45) when the difference between the actual supercharging pressure (P) and the atmospheric pressure ($P_{atm}$) decreases passing from the high-supercharging-pressure operation zone (C) to the intermediate-supercharging-pressure operation zone (B).

10. The control method as set forth in claim 1 further including the step of zeroing or freezing the integral term of the regulators (44, 45) when a rapid variation of the objective supercharging pressure ($P_{obj}$) occurs.

11. The control method as set forth in claim 10 further including the steps of:

determining a gradient ($\Delta P_{obj}$) of the objective supercharging pressure ($P_{obj}$) by calculating the difference between the objective supercharging pressure ($P_{obj}$) and the filtered objective supercharging pressure ($P_{obj-F}$) which has been filtered by means of a fifth low-pass filter (49); and establishing the presence of a rapid variation of the objective supercharging pressure ($P_{obj}$) when the gradient ($\Delta P_{obj}$) of the objective supercharging pressure ($P_{obj}$) is higher than a threshold value.

12. The control method as set forth in claim 10 further including the step of zeroing or freezing the integral term of the regulators (44, 45) when a rapid variation of the objective supercharging pressure ($P_{obj}$) occurs, only if the absolute value of the integral term is higher than a threshold value.

13. The control method as set forth in claim 1 further including the steps of:

learning a border supercharging pressure ($P_{BORDER}$) beneath which wastegate (16) remains substantially closed irrespective of the control action of the controlling actuator (35); and establishing the borders of the intermediate-supercharging-pressure operation zone (B) according to the difference between the border supercharging pressure ($P_{BORDER}$) and the atmospheric pressure ($P_{atm}$).

14. The control method as set forth in claim 13 further including the step of centering the intermediate-supercharging-pressure operation zone (B) on the difference between the border supercharging pressure ($P_{BORDER}$) and the atmospheric pressure ($P_{atm}$).

15. The control method as set forth in claim 13 wherein the step of learning the border supercharging pressure ($P_{BORDER}$) further includes the steps of:

closing completely the controlling actuator (35) of the wastegate (16) for a given learning time interval in which a reduced mass flow rate ($M_R$) of the supercharger (14) exceeds the predetermined threshold value; and assuming the border supercharging pressure ($P_{BORDER}$) to be substantially equal to the maximum actual supercharging pressure (P) during the learning time interval.

* * * * *